US006672424B2

United States Patent
Gadefait et al.

(10) Patent No.: US 6,672,424 B2
(45) Date of Patent: *Jan. 6, 2004

(54) ACOUSTICALLY TREATED TURBOMACHINE MULTI-DUCT EXHAUST DEVICE

(75) Inventors: Benoit Denis Rene Gadefait, Pau (FR); Hubert Hippolyte Vignau, Nay (FR); Marie-Laure Olga Simone Ortiz, Artigueloutan (FR)

(73) Assignee: Turbomeca, Bordes (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,330

(22) Filed: Dec. 15, 1999

(65) Prior Publication Data

US 2002/0166718 A1 Nov. 14, 2002

(30) Foreign Application Priority Data

Dec. 17, 1998 (FR) .............................. 98 15942

(51) Int. Cl.⁷ .............................. F01N 7/00; F01N 1/24
(52) U.S. Cl. ........................ 181/225; 181/222; 181/252; 181/256
(58) Field of Search ................................ 181/225, 226, 181/224, 222, 228, 252, 256, 267, 268; 415/119

(56) References Cited

U.S. PATENT DOCUMENTS

| | | | | |
|---|---|---|---|---|
| 2,869,671 A | * | 1/1959 | Schlachter et al. .......... | 181/50 |
| 2,886,121 A | * | 5/1959 | Welbourn ..................... | 181/42 |
| 3,033,307 A | * | 5/1962 | Sanders et al. ............... | 181/59 |
| 3,511,336 A | * | 5/1970 | Rink et al. .................... | 181/42 |
| 3,602,333 A | * | 8/1971 | Kobayashi et al. ........... | 181/42 |
| 3,692,141 A | | 9/1972 | Labussiere et al. | |
| 3,721,389 A | | 3/1973 | Mackinnon et al. | |
| 3,831,376 A | | 8/1974 | Moorehead | |
| 3,848,697 A | | 11/1974 | Jannot et al. | |
| 3,890,060 A | | 6/1975 | Lipstein | |
| 4,109,750 A | | 8/1978 | Wirt | |
| 4,122,672 A | * | 10/1978 | Lowrie ..................... | 60/226 R |
| 4,244,441 A | | 1/1981 | Tolman | |
| 4,953,659 A | * | 9/1990 | Norris ........................ | 181/257 |
| 5,110,258 A | * | 5/1992 | Morinushi et al. .......... | 415/119 |
| 5,777,947 A | * | 7/1998 | Ahuja ........................... | 367/1 |
| 6,035,964 A | * | 3/2000 | Lange ........................ | 181/224 |

FOREIGN PATENT DOCUMENTS

| | | | | |
|---|---|---|---|---|
| DE | 34 01 210 A1 | * | 7/1985 | ................. 181/224 |
| GB | 2 231 916 A | * | 11/1990 | ............. F01N/1/24 |

* cited by examiner

*Primary Examiner*—Robert E. Nappi
*Assistant Examiner*—Edgardo San Martin
(74) *Attorney, Agent, or Firm*—Oblon, Spivak, McClelland, Maier & Neustadt, P.C.

(57) ABSTRACT

A multi-duct diffusion exhaust device for a turbomachine. The exhaust device including an annular inlet, an outer casing shaped symmetrically overall with respect to an axis, one or more internal partitions defining several roughly concentric ducts for an exhaust stream to flow through, and an absorbent coating capable of absorbing some of the acoustic energy generated by the flow. The absorbent coating being provided on at least one of a surface of one internal partition and an interior surface of the outer casing. The absorbent coating having a thickness that is tailored along a length of the exhaust device to optimize the flow in the ducts by maintaining progressive diffusion and avoiding detachment near stationary surfaces.

23 Claims, 6 Drawing Sheets

ACOUSTICALLY TREATED TURBOMACHINE MULTI-DUCT EXHAUST DEVICE

BACKGROUND OF THE INVENTION

1. Field of the Invention

The subject of the present invention is an exhaust device for a turbomachine such as an auxiliary power unit, a turbogenerator, a fan, a boost compressor, a turboprop or alternatively a turbomotor capable of driving, for example, a helicopter rotor shaft, the exhaust device being treated in such a way that its acoustic signature is reduced.

2. Discussion of the Background

It is known that turbomachines are equipped with an exhaust device which acts as a diffuser capable of slowing down the exhaust stream. An exhaust device of this kind generally comprises an outer casing, the shape of which is symmetric with respect to an axis. The precise shape of the exhaust device and its length along the axis of the exhaust stream may be determined so as to yield given performance bearing in mind, in particular, the static pressure at the inlet and at the outlet of the exhaust device.

One or more internal partitions defining several roughly concentric ducts for the exhaust stream to flow through have already been provided in exhaust devices for turbomachines, inside the casing. The multi-duct exhaust device thus produced has a smaller axial length for a given level of performance.

It is also known that in many applications it is desirable to reduce the noise generated by the turbomachines as far as possible. Acoustic treatment of the exhaust device has been envisaged for this. However, hitherto, the reduction in acoustic signature is considered as being insufficient. Document U.S. Pat. No. 4,109,750 describes a device for attenuating the sound of a turbomachine by means of the use of an acoustic material which can be applied to the walls of an internal partition. However, this application is to the detriment of the aerodynamic performance.

SUMMARY OF THE INVENTION

The object of the present invention is to improve the reduction in the acoustic signature of a turbomachine while at the same time making it possible to obtain an exhaust device with given aerodynamic performance. More specifically, the present invention makes it possible to improve both the aerodynamic performance and the acoustic performance of an exhaust device for a turbomachine, particularly a turbomotor for driving a helicopter rotor.

To this end, the turbomachine diffusion exhaust device according to the invention, which is of the multi-duct type with an annular inlet, comprises an outer casing shaped symmetrically overall with respect to an axis, and one or more internal partitions defining several roughly concentric ducts for the exhaust stream to flow through. In accordance with the present invention, an absorbent coating capable of absorbing some of the acoustic energy generated by the flow is provided on at least one surface of one internal partition and/or on the interior surface of the outer casing. The thickness of the absorbent coating is tailored along the length of the exhaust device to optimize the flow in the various ducts, while maintaining progressive diffusion and avoiding detachment near the stationary surfaces.

By virtue of this arrangement, the acoustic signature of the turbomachine is greatly reduced because it becomes possible to benefit from the increase in acoustically-treated surface area due to the presence of the internal partitions.

The absorbent coating is chosen not only according to its inherent absorption capability, characterized by its coefficient of absorption as a function of frequency, but also according to the characteristics of the aerodynamic flow (temperature of the gases in the exhaust and flow speed).

To optimize the aerodynamic performance, the area of the various ducts may advantageously vary along the length of the axis so as simultaneously to optimize the flow speed and the thickness of the absorbent coating, that is to say the acoustic performance.

The absorbent coating is arranged on the surface of the internal partition and/or the outer casing facing the flow.

The absorbent coating comprises an acoustic material which may be of the porous type or of the resonator type in a single layer or as multiple layers.

In the case of a porous material, this material may consist of agglomerated fibres (felt, glasswool or rockwool) or of an interstitial array produced by a collection of hollow microspheres. In the case of such a porous material, the absorbent coating further comprises an acoustically transparent wall which has the purpose of mechanically retaining the porous material. This wall may or may not be secured to the porous material.

When there is a central body along the axis of the device over most of its length, the said central body may also on its surface have an absorbent coating as defined hereinabove, and this further increases the acoustically treated surface area.

Likewise, if the exhaust stream is let out via a part which deflects the stream with respect to the inlet axis, the said deflecting part, which may be of any shape, may have an absorbent coating on its interior surface.

BRIEF DESCRIPTION OF THE DRAWINGS

The present invention will be better understood from studying a few particular embodiments which are taken by way of entirely non-limiting examples and which are illustrated by the appended drawings, in which.

DETAILED DESCRIPTION OF THE PREFERRED EMBODIMENTS

Figure 1:
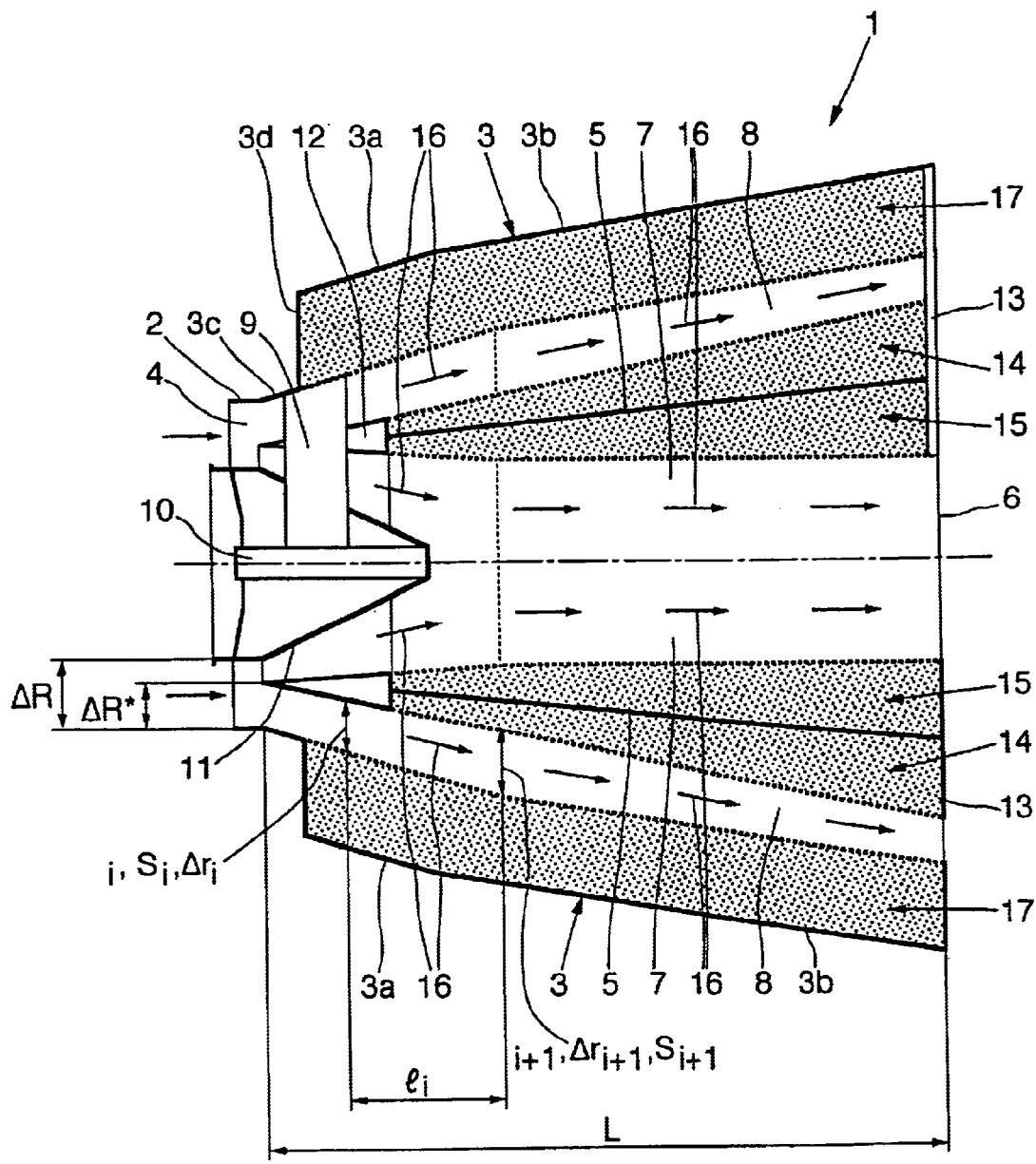
FIG. 1 is a diagrammatic view in section along the flow axis, of one embodiment of a turbomachine exhaust device according to the invention.

In the form depicted in FIG. 1, the turbomachine exhaust device according to the invention, referenced 1 in its entirety, is mounted at the outlet end 2 of a turbine engine, not depicted in the figure. The exhaust device 1 in general comprises an outer casing 3 which, in the example illustrated, has a divergent frustoconical overall shape. Mounted inside the casing 3 is a partition 5 which, in the example illustrated, also has a divergent frustoconical overall shape. The casing 3 has a first part 3a at the same end as the inlet 4, corresponding to the outlet from the turbine engine, with a first cone angle and a second part 3b, at the same end as the outlet 6, with a different, narrower, cone angle.

The partition 5 defines a first central duct 7 for the exhaust stream to flow through and a second, annular, duct 8 between the partition 5 and the outer casing 3, the annular duct 8 being concentric with the central duct 7.

The partition 5 is held inside the casing 3 near the inlet 4 by three radial support arms 9 advantageously arranged 120° apart, the said support arms 9 being fixed, on the one hand, to an inner tube 10 of the inner cone 11 and, on the other hand, to a turned-back part 3c of the outer casing 3. The partition 5 is extended at the same end as the inlet 4 by a conical connecting piece 12, which is fixed to the support arms 9. The vertex of the cone of the connecting piece which constitutes the leading edge of the partition 5 is in the plane of the inlet 4, which corresponds to the outlet from the turbine engine.

At the same end as the outlet 6, the partition 5 is held in place by means of support arms 13 fixed both to the partition 5 and to the outer casing 3 and also arranged 120° apart.

According to the present invention, an absorbent coating 14 is provided on the surface of the internal partition 5.

In the embodiment illustrated in FIG. 1, the absorbent coating 14 is arranged on the exterior surface of the partition 5, while a similar absorbent coating 15 is provided on the interior surface of the partition 5. This absorbent coating is capable of absorbing some of the acoustic energy generated by the flow which is symbolized in FIG. 1 by the arrows 16. The thickness of the coatings 14 and 15 increases from the connecting piece 12 to the outlet 6.

In the embodiment illustrated in FIG. 1, the interior surface of the outer casing 3 also has an absorbent coating 17 of similar structure to the absorbent coatings 14 and 15. The absorbent coating 17 defines the exterior surface of the annular duct 8. The casing 3 therefore has a step 3d, corresponding to the thickness of the coating 17, near the inlet 4 and extending outwards.

The various absorbent coatings 14, 15 and 17 may have different absorption characteristics along the length of the exhaust device 1. Likewise, the thickness of each of the absorbent coatings 14, 15 and 17 may vary along the length of the exhaust device. Thus, the thickness of the absorbent coatings 14 and 15 increases from the inlet 4 end to the outlet 6 end. The thickness of the absorbent coating 17 is approximately constant over the entire length of the exhaust device 1 in the embodiment illustrated in FIG. 1. What this means is that the working passage cross section for the flow of the gaseous exhaust stream which flows through the annular duct 8, on the one hand, and through the central duct 7, on the other hand, can be tailored so as to optimize the flow, the diffusion of which advantageously remains progressive and does not detach near the stationary surfaces.

In the alternative form illustrated in FIG. 1, the passage cross section of the central duct 7 is approximately constant, while the passage cross section of the annular duct 8 increases from the inlet to the outlet 6 by virtue of the increase in the diameter of the duct 8.

In any event, the geometric shape of the internal partition must be tailored to the thickness of the absorbent coatings 14, 15 and 17 so that the working passage cross section for the gas stream allows the best possible recuperation of energy while keeping the pressure as low as possible at the inlet of the exhaust, that is to say at the outlet from the turbine engine, through an appropriate effect of slowing down the gas stream in the exhaust device.

Figure 8:
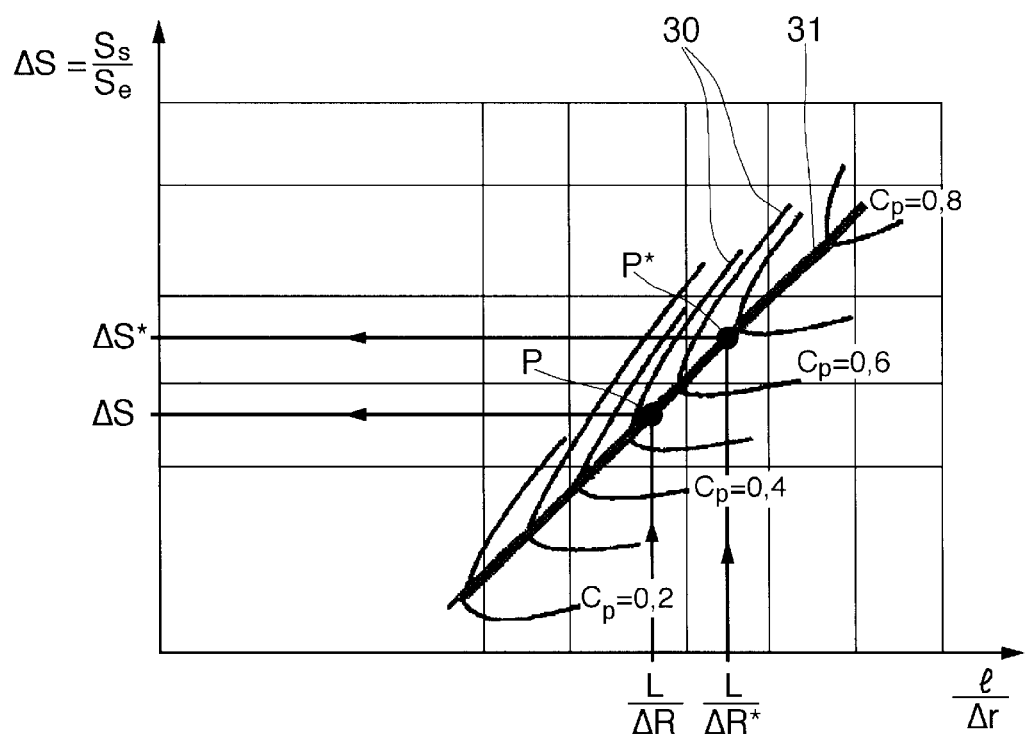
FIG. 8 is a diagram illustrating the aerodynamic performance of an exhaust device.

FIG. 8 illustrates the aerodynamic performance of an exhaust device like the one illustrated in FIG. 1. The graph that is FIG. 8 has, on the ordinates axis, the ratio $\Delta S = S_s/S_e$ between the working surface area $S_s$ for the passage of the gas stream at the outlet of a section of the exhaust device and the working passage surface area $S_e$ of the inlet of another section. On the abscissae axis are plotted the values $l/\Delta r$ where l is the axial length between the two sections considered of the exhaust device and $\Delta r$ is the difference between the external radius and the internal radius of the annular inlet section. The total length of the exhaust illustrated in FIG. 1 is L, the height of the stream at the inlet being $\Delta R$.

FIG. 8 also depicts a number of curves 30 which represent the static pressure recuperation coefficient $C_p$, where:

$$c_p = -\frac{\text{outlet static pressure} - \text{inlet static pressure}}{(\text{total pressure} - \text{static pressure})_{inlet}}$$

For a given speed of the flow of the gas stream, it is therefore possible to define an optimal performance line joining the various minima of the curves representing the static pressure recuperation coefficient $C_p$. This line is referenced 31 in FIG. 8. It makes it possible, for an exhaust device of length L and of stream height at the inlet $\Delta R$, to determine the outlet cross section which will yield the maximal exhaust performance.

Optimization of this exhaust device is performed iteratively on intermediate sections. The section $S_{i+1}$ marked in FIG. 1 is determined as a function of the section $S_i$, the distance $l_1$ between the inlet section i and outlet section i+1 and the value $\Delta r_i$.

Furthermore, the presence of the partition 5, which has zero initial thickness and the thickness of which varies along the length of the exhaust, makes it possible to divide the stream height at the inlet ($\Delta R$ becomes $\Delta R^*$) and therefore, according to curve 31 (point P*), increase the outlet cross section ($\Delta S$ becomes $\Delta S^*$), with all the other parameters unchanged.

The partition 5 with its coatings 14 and 15 therefore makes it possible, to the same axial length, to improve the aerodynamic performance of the exhaust device. This optimization is independent of the variation in thickness of the partition 5 with its coatings 14 and 15 which is chosen at will to optimize the acoustics.

The partition 5 with its coatings 14 and 15 therefore allows a combined improvement in the aerodynamic and in the acoustic performance.

Figure 2:
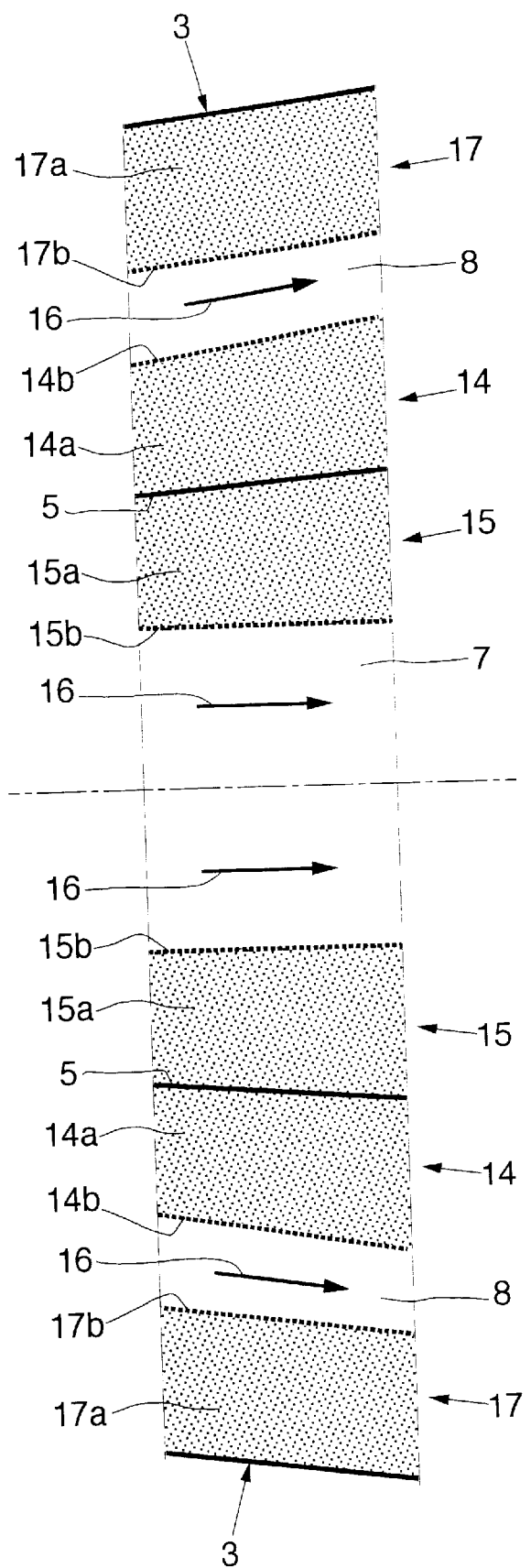
FIG. 2 is a view in section with cutaway showing, on a larger scale, a first alternative form of absorbent coating installed in the embodiment illustrated in FIG. 1.

Referring to FIG. 2, it is clear that in a first alternative from, the absorbent coating 14, 15, 17 used in the present invention comprises, each time, an acoustic absorption layer 14a, 15a or 17a, and an acoustically transparent wall 14b, 15b or 17b. The acoustically transparent wall may, for example, be a metal wall with a number of through-holes, depicted diagrammatically in the figure in the form of a broken line. The acoustic absorption layer 14a, 15a or 17a consists, in the alternative form depicted in FIG. 2, of a fibrous material which dissipates the energy of the sound waves by viscous friction of the gases in the pores of the material. In each of the absorbent coatings 14, 15 and 17, the fibrous material is thus sandwiched between a rigid solid wall such as the internal partition wall 5 or the wall of the outer casing 3, on the one hand, and the acoustically transparent wall 14b, 15b or 17b. The acoustically transparent wall 14b, 15b or 17b is on the same side as the flow symbolized by the arrows 16 in the figure. The fibrous material 14a, 15a or 17a may advantageously consist of rockwool, glasswool, ceramic fibres or of a similar product capable of withstanding the high temperatures which exist within the exhaust stream.

When the turbine engine is operating, the exhaust stream flows through the ducts 7 and 8. The acoustic treatment obtained is efficient over a wide range of frequencies because of the very nature of the acoustic absorption layer 14a, 15a or 17a which consists of the fibrous material.

Figure 3:
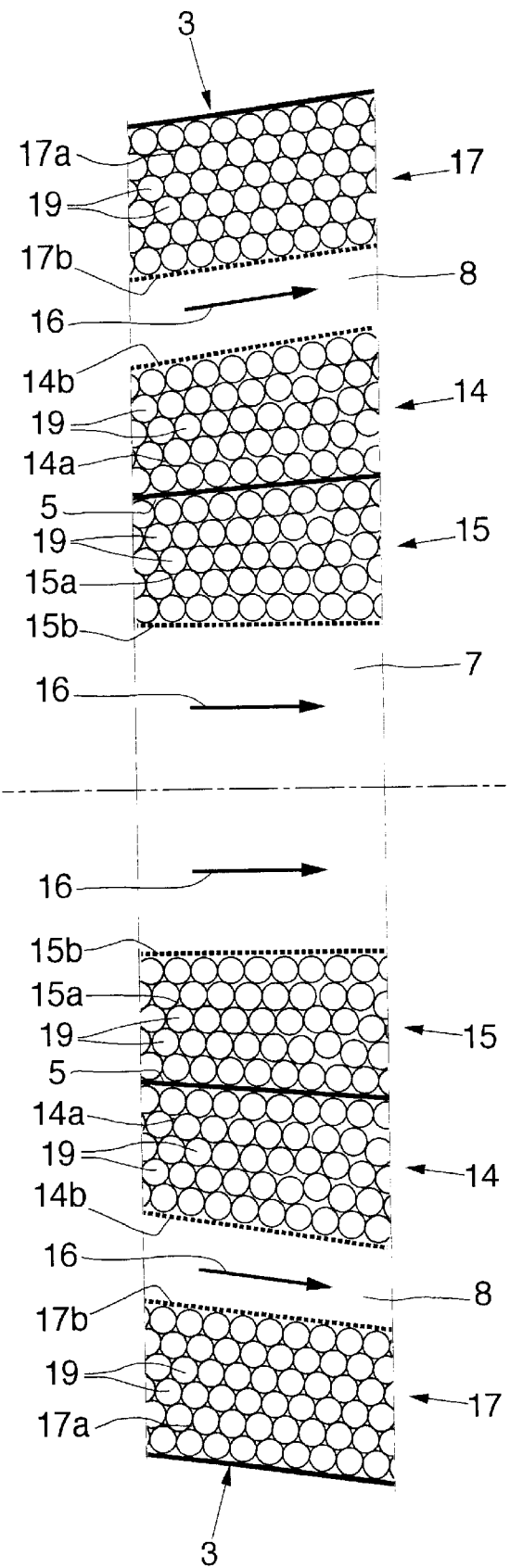
FIG. 3 is a view in section with cutaway similar to FIG. 2, of an alternative form of absorbent coating.

In the embodiment illustrated in FIG. 3, in which similar parts bear the same references, the acoustic absorption layers 14a, 15a and 17a consist of a bed of perforated spheres 19 made of a refractory material and built up loosely or in several superimposed layers delimiting the absorbent coating, that is to say, in particular, between the outer wall 3 and the acoustically transparent wall 17b, the internal partition wall 5 and the two acoustically transparent walls 14b and 15b.

Figure 4:
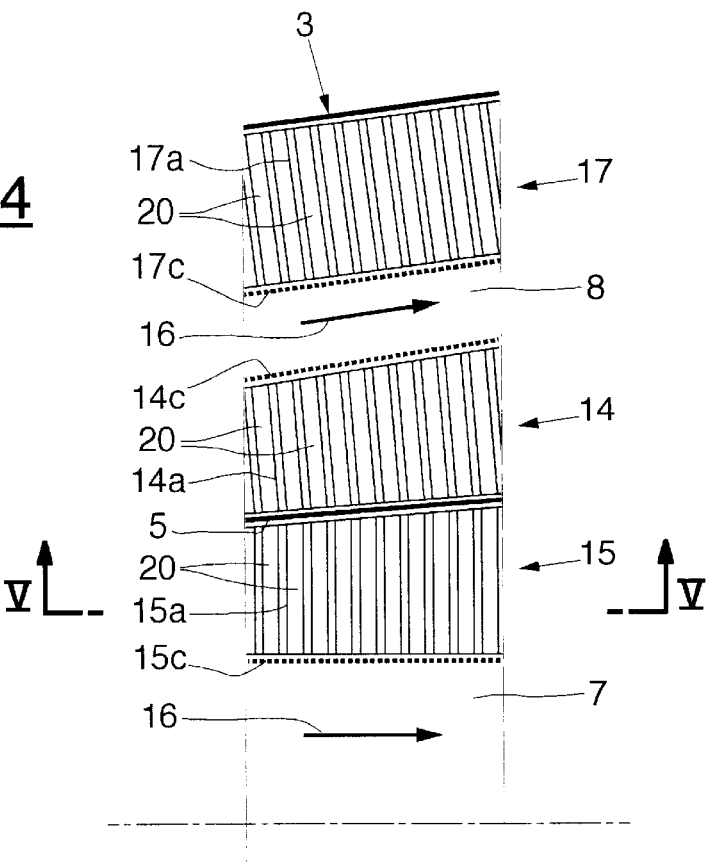
FIG. 4 is a view similar to FIGS. 2 and 3, showing another alternative form of absorbent coating.
Figure 5:
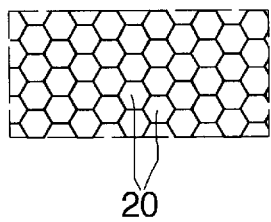
FIG. 5 is a view in section on V—V of FIG. 4.
Figure 5:
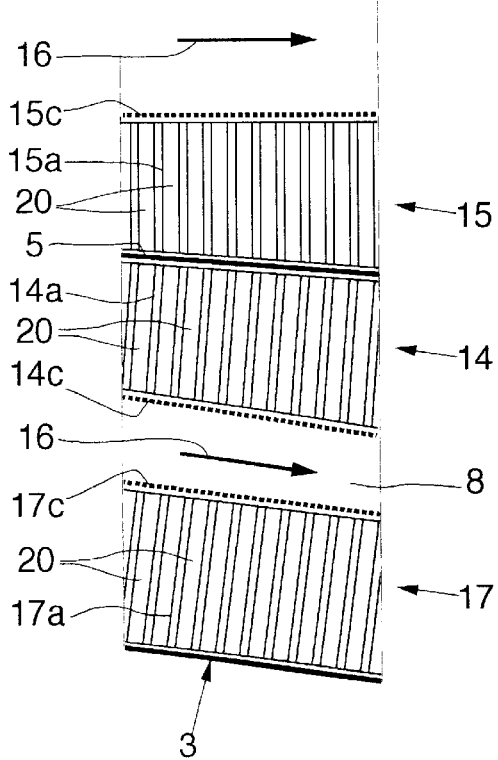

In the embodiment illustrated in FIGS. 4 and 5, the absorbent coating 14, 15 and 17 consists of panels 14a, 15a, 17a with a resonator structure here depicted in the form of Helmholtz resonators. The cavities or open cells 20 have the shape of cylinders of hexagonal base, as can be seen in the sectional view that is FIG. 5, thus forming a honeycomb structure. The axis of the cells 20 is, in this embodiment and by way of illustration, roughly perpendicular to the direction of the flow. On one side, this structure is welded to a rigid solid wall such as that of the outer casing 3 or the internal partition 5, thus defining a closed bottom for the various cavities or cells 20. On the other side, there is an acoustically resistive porous wall 14c, 15c or 17c.

The wall 14c, 15c or 17c generally comprises a relatively thin layer of a material capable of dissipating the energy of the sound waves by viscous friction of the gases in the pores of the material.

As an alternative, at least one of the walls 14c, 15c or 17c may be replaced by a simple perforated sheet.

Thus, as before, the absorbent coating 14, 15 or 17 makes it possible, when the exhaust stream flows, to create a movement of the gases through the pores of the wall 14c, 15c or 17c causing resistive damping by dissipating the sound energy. This damping may be improved through a judicious choice of depth of the cavities or cells 20, this depth being a multiple of a quarter of the wavelength.

It is thus possible to obtain acoustic damping at a given frequency which depends on the depth of the cavities or cells 20. The acoustic damping also depends on other parameters such as the temperature of the gases in the flow and the speed of the flow. It will be understood that the structure of the acoustic coating and, in particular, that the thickness of the acoustic absorption layers 14a, 15a or 17a, that is to say the depth of the cavities or cells 20 of cellular structure illustrated in FIGS. 4 and 5 can easily be tailored to suit the operating parameters of the turbomachine.

Figure 6:
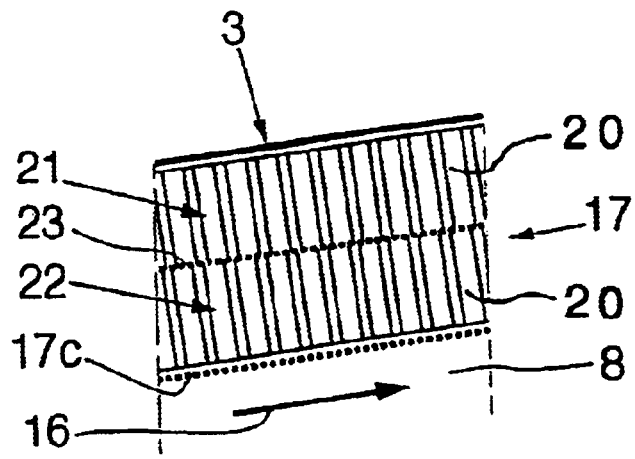
FIG. 6 is a view in partial section with cutaway of a modification to the alternative form illustrated in FIG. 4.

FIG. 6 illustrates an example of a modification of the cellular structure illustrated in FIG. 4, for the absorbent coating 17.

In this example, use is made of a double resonator, the resonators consisting of two superimposed resonators here depicted in the form of Helmholtz resonators. A porous wall 23 is inserted between two layers 21 and 22 and cavities or open cells 20. In the example illustrated, the depth of the cavities or cells of the two layers 21 and 22 is identical, but it would, on the other hand, be possible to envisage different depths. The double Helmholtz resonator is associated, on the flow side, with an acoustically resistive porous wall 17c identical to the one in the previous embodiment.

The porous walls 17c and 23 may be identical and constitute the resistive walls of the two resonators. The sound waves therefore enter the first resonator comprising the porous wall 17c and the cavities of the layer 22 then enter the second resonator comprising the porous wall 23 and the cavities of the layer 21.

As an alternative, the wall 23 may simply consist of a porous material which acoustically presents little or no resistance. The wall 23 may also consist of a simple perforated sheet.

An absorbent coating of this kind with a double Helmholtz resonator has the advantage of spreading the frequency tuning across a broader band than can be achieved in the case of a single row of resonators.

Figure 7:
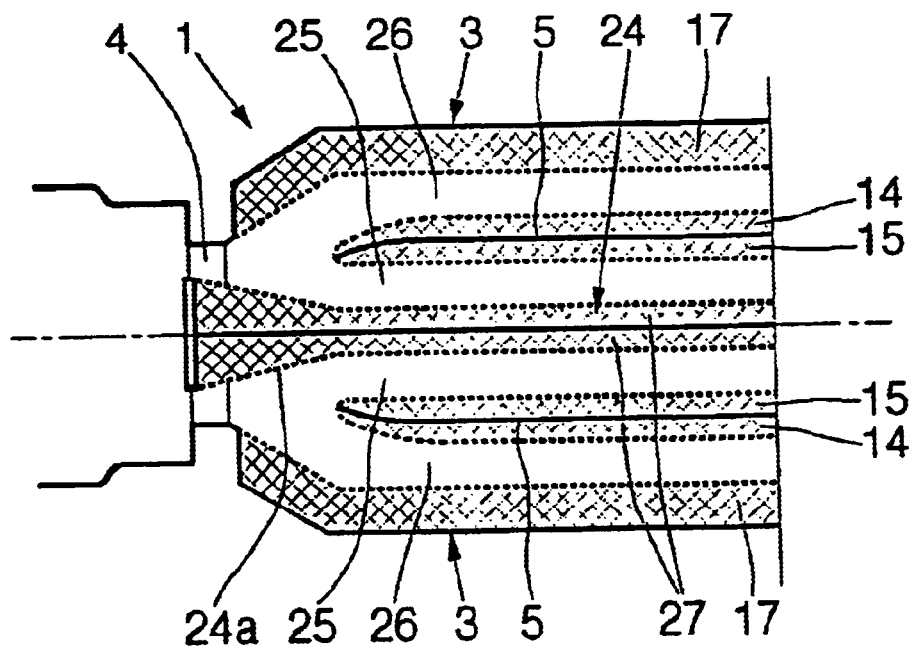
FIG. 7 is a diagrammatic sectional view similar to FIG. 1 of another embodiment of the invention.

The embodiment illustrated in FIG. 7 diagrammatically illustrates the case of an exhaust 1 comprising a central body 24 extending essentially over the entire length of the exhaust 1. The central body has, at the same end as the inlet 4, a conical shape 24a, the cross section of which decreases in the direction of the flow. A partition of roughly conical 5 and then cylindrical shape is mounted inside the exhaust 1 between the central body 24 and the outer wall 3. Two roughly annular and concentric flow ducts 25 and 26 are thus defined inside the exhaust 1, the overall shape of which is first of all conical and then approximately cylindrical.

An acoustically absorbent coating is provided on all the interior surfaces of the exhaust 1 in contact with the gaseous flow stream. This coating may be identical to one described with reference to any one of the preceding embodiments. Thus, there is a coating 17 inside the outer wall 3. Likewise, there is an acoustically absorbent coating 14, 15 on each side of the solid wall of the internal partition 5. Finally, there is an acoustically absorbent coating 27 right around the central body 24.

The turbomachine multi-duct exhaust according to the present invention is thus acoustically treated irrespective of its geometry, the inlet generally being symmetric with respect to the axis of the flow, it being possible for the concentric flow ducts to evolve into any possible outlet shape, either along the axis of the engine or away from this axis, thus fulfilling a function of deflecting the jet.

The partition inside the exhaust device delimiting the flow ducts may have an acoustically absorbent coating the thickness of which changes or remains uniform according to the acoustic characteristics that it is desired to obtain. The stream heights of the various flow ducts may be optimized so that the flow speeds in each duct are tailored to the acoustically treated surface area and so that the acoustic performance is as good as possible.

Although in the embodiments illustrated, the outer casing and the internal partition were equipped with an acoustically absorbent coating, it will be understood that the invention applies equally to cases in which just the internal partition is equipped with such an acoustically absorbent coating. The invention would also be applicable under the same conditions to a structure in which the internal partition was not coated with an acoustically absorbent coating but in which this coating was provided only on the interior of the outer casing of the exhaust.

Furthermore, although in the embodiments illustrated, the acoustically absorbent coatings had the same structure in one particular embodiment, it will be understood that it would be possible, in order to obtain different characteristics, to provide acoustically absorbent coatings with different structures at different points in the same exhaust system, so as to satisfy specific acoustic-treatment conditions.

By virtue of the present invention, it becomes possible to very significantly reduce the acoustic signature of the exhaust and therefore of the turbomachine.

By virtue of the existence of the internal partition, the surface area for acoustic treatment can be considerably increased while maintaining the same size and aerodynamic performance which is the same or better. It is also possible to improve the compactness of the assembly by producing a shorter exhaust while retaining an optimum surface area for acoustic treatment.

What is claimed is:

1. A multi-duct diffusion exhaust device for an exhaust gas stream at an outlet of a turbomachine, comprising an annular inlet, an outer casing shaped symmetrically overall with respect to an axis, and at least one internal partition defining roughly concentric passages for the exhaust gas stream to flow through, wherein said at least one internal partition is provided, on at least one surface thereof, with an acoustic energy absorbent coating capable of absorbing some of the acoustic energy generated by the flow and entirely covering the at least one surface, wherein at least an interior surface of the outer casing is provided with an acoustic energy adsorbent coating capable of absorbing some of the acoustic energy generated by the flow, and wherein a thickness of the absorbent coating of said at least one internal partition and a thickness of the absorbent coating of said interior surface vary along a length of the exhaust device such that an overall cross-section of said passages continuously increases from said annular inlet to said outlet maintaining a low back pressure at the inlet of the exhaust.

2. A turbomachine exhaust device according to claim 1, wherein the absorbent coating of said at least one internal partition and the absorbent coating of said interior surface exhibit absorption characteristics which differ according to a nature of the flow past a surface thereof.

3. A turbomachine exhaust device according to claim 1, wherein the passages have an area that varies along a length of the axis so as simultaneously to optimize a flow speed and the thickness of the absorbent coating of said at least one internal partition and the thickness of the absorbent coating of said interior surface.

4. A turbomachine exhaust device according to claim 1, wherein the absorbent coating of at least one of said at least one internal partition and said interior surface is arranged on a surface thereof facing the flow.

5. A turbomachine exhaust device according to claim 1, wherein the absorbent coating of said at least one internal partition and the absorbent coating of said interior surface comprise at least one of a porous acoustic material and a resonator acoustic material.

6. A turbomachine exhaust device according to claim 5, wherein the acoustic material is a fibrous material selected from the group of glasswool, rockwool, and ceramic fibres.

7. A turbomachine exhaust device according to claim 5, wherein the acoustic material comprises a number of hollow microspheres arranged in one or more layers or loosely.

8. A turbomachine exhaust device according to one of claim 6 or 7, wherein the absorbent coating of said at least one internal partition and the absorbent coating of said interior surface comprise an acoustically transparent wall capable of retaining the acoustic material.

9. A turbomachine exhaust device according to claim 5, wherein the absorbent coating of said at least one internal partition and the absorbent coating of said interior surface comprise the resonator acoustic material with an open-cell structure associated with an acoustically resistive porous wall and closed on the other side by a rigid base wall.

10. A turbomachine exhaust device according to claim 9, wherein the resonator acoustic material comprises several superimposed layers of resonators having at least one of different thicknesses and equal thicknesses, a porous wall being inserted between two adjacent layers.

11. A turbomachine exhaust device according to claim 1, further comprising a central body along the axis of the device over most of its length, the central body having a surface with an absorbent coating.

12. A turbomachine exhaust device according to claim 1, wherein the exhaust gas stream is let out through a deflecting part which deflects the stream with respect to an inlet axis, said deflecting part having an internal surface coated by an absorbent coating.

13. A turbomachine exhaust device according to claim 9, wherein the open-cell structure has cells with axes substantially perpendicular to the porous wall.

14. A multi-duct diffusion exhaust device for a turbomachine, the exhaust device comprising:

a casing shaped symmetrically with respect to an axis, the casing having an inlet and an outlet;

at least one partition mounted within the casing and defining at least two substantially concentric ducts adapted to allow an exhaust stream to flow therethrough; and an absorbent coating provided on a surface of the at least one partition, the absorbent coating having a thickness that varies along a length of the exhaust device such that an overall cross-section of said ducts continuously increases from said inlet to said outlet maintaining a low back pressure at the inlet of the exhaust.

15. A turbomachine exhaust device according to claim 14, wherein at least one of the at least two ducts has a cross-sectional area that varies along the length of the exhaust device so as to simultaneously optimize a flow speed of the exhaust stream and the thickness of the absorbent coating.

16. A turbomachine exhaust device according to claim 14, wherein the absorbent coating comprises at least one of a porous acoustic material and a resonator acoustic material.

17. A turbomachine exhaust device according to claim 14, wherein the absorbent coating comprises an acoustic material and an acoustically transparent wall configured to retain the acoustic material.

18. A turbomachine exhaust device according to claim 17, wherein the acoustic material comprises at least two superimposed layers of acoustically absorbing material and a porous wall positioned between adjacent layers of the at least two superimposed layers.

19. A turbomachine exhaust device according to claim 14, wherein the absorbent coating comprises:

a resonator acoustic material having an open-cell structure;

an acoustically resistive porous wall configured to retain the resonator acoustic material on a first end; and a rigid base wall configured to retain the resonator acoustic material on a second end opposite the first end, wherein the open-cell structure has cells with axes substantially perpendicular to a direction of flow of the exhaust stream.

20. A turbomachine exhaust device according to claim 1, wherein an overall passage area of said ducts continuously increase from the annular inlet to an outlet of the exhaust device.

21. A turbomachine exhaust device according to claim 1, wherein the one or more internal partitions has a geometrical shape that is tailored to the thickness of the absorbent coating so that the passage area of the ducts allows greater recuperation of the energy while keeping pressure low at intake.

22. A turbomachine exhaust device according to claim 14, wherein an overall passage area of said ducts continuously increase from the inlet to the outlet.

23. A turbomachine exhaust device according to claim 14, wherein the at least one partition has a geometrical shape that is tailored to the thickness of the absorbent coating so that a passage area of the ducts allows greater recuperation of energy generated by the flow while keeping pressure low at intake.

* * * * *